US012560568B2

(12) United States Patent
Gaupp

(10) Patent No.: US 12,560,568 B2

(45) **Date of Patent: *Feb. 24, 2026**

(54) COMBINATION ELECTRODE HAVING A HYDROGEL DIAPHRAGM

(71) Applicant: Hamilton Bonaduz AG, Bonaduz (CH)

(72) Inventor: Theo Gaupp, Untervaz (CH)

(73) Assignee: Hamilton Bonaduz AG, Bonaduz (CH)

( * ) Notice: Subject to any disclaimer, the term of this patent is extended or adjusted under 35 U.S.C. 154(b) by 849 days.

This patent is subject to a terminal disclaimer.

(21) Appl. No.: 17/346,144

(22) Filed: Jun. 11, 2021

(65) Prior Publication Data

US 2021/0302353 A1 Sep. 30, 2021

Related U.S. Application Data

(63) Continuation-in-part of application No. PCT/EP2019/084408, filed on Dec. 10, 2019.

(30) Foreign Application Priority Data

Dec. 13, 2018 (DE) ......................... 102018132108.2
Dec. 10, 2019 (WO) ................. PCT/EP2019/084408

(51) Int. Cl.
*G01N 27/30* (2006.01)
*G01N 27/36* (2006.01)
(Continued)

(52) U.S. Cl.
CPC ......... *G01N 27/302* (2013.01); *G01N 27/301* (2013.01); *G01N 27/36* (2013.01); *G01N 27/40* (2013.01); *G01N 27/4035* (2013.01)

(58) Field of Classification Search
CPC .... G01N 27/302; G01N 27/301; G01N 27/36; G01N 27/40; G01N 27/4035; A61B 5/1468–14865
See application file for complete search history.

(56) References Cited

U.S. PATENT DOCUMENTS 3,666,651 A * 5/1972 Makabe ............. G01N 27/4035 204/419
3,911,901 A * 10/1975 Niedrach ............. A61B 5/1473 204/414
(Continued)

FOREIGN PATENT DOCUMENTS

CH 680311 A5 5/1990
CN 101052872 A 9/2005
(Continued)

OTHER PUBLICATIONS

Ferreira, N. N. et al., "Recent advances in smart hydrogels for biomedical applications: From self-assembly to functional approaches", European Polymer Journal, 2018, vol. 99, pp. 117-133, doi.org/10.1016/j.eurpolymj.2017.12.004 (17 Pages).
(Continued)

*Primary Examiner* — Alexander S Noguerola
(74) *Attorney, Agent, or Firm* — Imperium Patent Works; Darien K. Wallace

(57) ABSTRACT

A combination electrode includes a working electrode, a reference electrode, a hydrogel diaphragm, an outer tube and an inner tube. The working electrode is disposed in the inner tube. The reference electrode is disposed in a reference chamber formed between the inner tube and the outer tube. The hydrogel diaphragm seals the opening between an end of the outer tube and the inner tube when the hydrogel swells upon coming in contact with a first electrically conductive fluid that is introduced into the reference chamber. The diaphragm is coupled to the reference electrode in an electrically conductive manner through the first electrically conductive fluid, which contacts both the reference electrode and the diaphragm. The inner tube is closed by a glass membrane that is coupled to the working electrode in an electrically conductive manner through a second electrically (Continued)

conductive fluid that contacts both the glass membrane and the working electrode.

20 Claims, 11 Drawing Sheets

(51) Int. Cl.

| | |
|---|---|
| ***G01N 27/40*** | (2006.01) |
| ***G01N 27/403*** | (2006.01) |

(56) References Cited

U.S. PATENT DOCUMENTS

| | | | | |
|---|---|---|---|---|
| 3,957,612 | A * | 5/1976 | Niedrach | A61B 5/14542 204/414 |
| 4,816,130 | A * | 3/1989 | Karakelle | G01N 27/40 257/253 |
| 4,834,101 | A * | 5/1989 | Collison | G01N 27/4035 204/415 |
| 5,428,123 | A * | 6/1995 | Ward | B01D 71/54 210/500.21 |
| 7,790,323 | B2 | 9/2010 | Ehrismann et al. | H01M 10/40 429/314 |
| 9,134,266 | B2 | 9/2015 | Thrier | G01N 27/30 |
| 2005/0133369 | A1 | 6/2005 | Sovrano et al. | G01N 27/26 204/435 |
| 2008/0000771 | A1 | 1/2008 | Kakiuchi et al. | G01N 27/30 204/435 |
| 2011/0147213 | A1 | 6/2011 | Auerswald et al. | G01N 27/30 204/415 |
| 2012/0152765 | A1 | 6/2012 | Trapp et al. | G01N 27/26 205/787.5 |
| 2014/0034516 | A1 | 2/2014 | Woodward et al. | G01N 27/30 |

FOREIGN PATENT DOCUMENTS

| | | | |
|---|---|---|---|
| CN | 102183564 | A | 12/2010 |
| DE | 69526366 | T2 | 11/1995 |
| DE | 102009055092 | A | 12/2009 |
| DE | 102010030874 | A | 1/2012 |
| EP | 1172648 | A1 | 7/2000 |
| EP | 1124132 | A1 | 8/2001 |
| JP | 2002-540424 | A | 3/2000 |
| JP | 2005-274182 | A | 3/2004 |
| JP | 2007-064971 | A | 8/2005 |
| JP | 2008-514903 | A | 9/2005 |
| WO | WO 2000/58720 | | 3/2000 |
| WO | WO2005/073704 | A1 | 8/2005 |
| WO | WO2006/018425 | A2 | 8/2005 |
| WO | WO 2006/032284 | | 9/2005 |
| WO | WO2010/072509 | A1 | 7/2010 |

OTHER PUBLICATIONS

Office action of the Japanese Patent Office in a related Japanese patent application JP 2021-533420 dated Jan. 9, 2024, as well as the English translation of the Japanese Office action (15 pages).

Office action of the Japanese Patent Office in a related Japanese patent application JP 2021-533420 dated Jan. 9, 2024, as well as the English translation of the Japanese Office action (10 pages).

Office action of the Chinese Patent Office in a related Chinese patent application CN201980082749.6 dated Aug. 19, 2023, as well as the English translation of the Chinese Office action (10 pages).

Office action of the Japanese Patent Office in a related Japanese patent application JP 2021-533420 dated Jul. 29, 2024 citing no new references, as well as the English translation of the Japanese Office action (5 pages).

Ferreira et al., "Recent advances in smart hydrogels for biomedical applications: From self-assembly to functional approaches," European Polymer Journal, Bd. 99, pp. 17-133, Dec. 6, 2017 XP085351222 (17 pages).

Extended European Search Report (EESR) dated Jul. 4, 2025, from the European Patent Office in the related European application EP 25178456.7, along with an English translation (14 pages).

Office action of the Chinese Patent Office in a related Chinese patent application CN 201980082749.6 dated Mar. 30, 2024, as well as the English translation of the Japanese Office action (20 pages).

* cited by examiner

| SENSOR | FLUID TO BE MEASURED | $U_{DIFF}$/mV<br>n. 0 / ~30 | $\Delta U_{DIFF}$/mV<br>n. 0 / ~30 | $R_{REF}$/kOhm<br>n. 0 / ~30 |
|---|---|---|---|---|
| 0b. TAP sensor with 0.35 mm TG-500 | 3 M KCl<br>buffer pH 4<br>buffer pH 7<br>buffer pH 10 | -3 / -2<br>-3 / -2<br>-2 / -2<br>+1 / ±0 | 4 / 2 | 10.5 / 8.5<br>10.5 / 9.0<br>10.1 / 8.5<br>9.8 / 8.5 |
| 0c. TAP sensor with 0.35 mm TG-500 | 3 M KCl<br>buffer pH 4<br>buffer pH 7<br>buffer pH 10 | -3 / -2<br>-3 / -1<br>-1 / -1<br>±0 / ±0 | 3 / 2 | 8.0 / 6.7<br>8.2 / 7.0<br>8.0 / 6.9<br>7.9 / 6.8 |
| 1a. TAP sensor with 2x 0.35 mm TG-500 | 3 M KCl<br>buffer pH 4<br>buffer pH 7<br>buffer pH 10 | -3 / +1<br>-2 / ±0<br>-1 / ±0<br>+2 / +1 | 5 / 1 | 12.5 / 5.3<br>12.6 / 6.4<br>12.0 / 5.8<br>11.7 / 5.9 |
| 1b. TAP sensor with 2x 0.35 mm TG-500 | 3 M KCl<br>buffer pH 4<br>buffer pH 7<br>buffer pH 10 | -3 / -2<br>-2 / -1<br>-1 / -1<br>+1 / ±0 | 4 / 2 | 12.2 / 8.0<br>11.9 / 8.8<br>11.3 / 8.0<br>11.1 / 7.9 |
| 1c. TAP sensor with 2x 0.35 mm TG-500 | 3 M KCl<br>buffer pH 4<br>buffer pH 7<br>buffer pH 10 | -3 / ±0<br>-3 / +1<br>-2 / +1<br>+1 / +3 | 4 / 3 | 8.6 / 6.8<br>7.0 / 7.6<br>6.9 / 6.0<br>6.6 / 6.2 |
| 2a. Polyplast sensor with 0.35 mm TG-500 | 3 M KCl<br>buffer pH 4<br>buffer pH 7<br>buffer pH 10 | -3 / -2<br>-2 / -2<br>-1 / -2<br>+1 / +1 | 4 / 3 | 9.4 / 7.2<br>9.5 / 7.3<br>9.1 / 7.1<br>8.5 / 7.0 |
| 2b. Polyplast sensor with 0.35 mm TG-500 | 3 M KCl<br>buffer pH 4<br>buffer pH 7<br>buffer pH 10 | -3 / -2<br>-2 / -2<br>-1 / -1<br>+1 / +1 | 4 / 3 | 10.2 / 7.9<br>10.5 / 8.3<br>10.0 / 7.6<br>9.4 / 7.3 |
| 2c. Polyplast sensor with 0.35 mm TG-500 | 3 M KCl<br>buffer pH 4<br>buffer pH 7<br>buffer pH 10 | -3 / -2<br>-2 / -2<br>-1 / -1<br>+2 / +1 | 5 / 3 | 10.5 / 8.9<br>11.0 / 9.1<br>10.6 / 8.5<br>10.2 / 8.5 |

FIG. 4A

| SENSOR | FLUID TO BE MEASURED | $U_{DIFF}$/mV<br>n. 0 / ~30 | $\Delta U_{DIFF}$/mV<br>n. 0 / ~30 | $R_{REF}$/kOhm<br>n. 0 / ~30 |
|---|---|---|---|---|
| 3a. TAP sensor with 0.50 mm TG-500 | 3 M KCl | -4 / +2 | 4 / 2 | 13.7 / 6.6 |
| | buffer pH 4 | -3 / +2 | | 13.9 / 6.9 |
| | buffer pH 7 | -2 / +2 | | 13.3 / 6.7 |
| | buffer pH 10 | ±0 / +4 | | 13.0 / 6.7 |
| 3b. TAP sensor with 0.50 mm TG-500 | 3 M KCl | -4 / ±0 | 3 / 2 | 8.2 / 7.0 |
| | buffer pH 4 | -3 / ±0 | | 8.3 / 7.8 |
| | buffer pH 7 | -3 / ±0 | | 8.0 / 6.9 |
| | buffer pH 10 | -1 / +2 | | 7.8 / 7.1 |
| 3c. TAP sensor with 0.50 mm TG-500 | 3 M KCl | -4 / ±0 | 3 / 3 | 9.2 / 7.2 |
| | buffer pH 4 | -3 / ±0 | | 9.5 / 7.3 |
| | buffer pH 7 | -1 / +1 | | 8.5 / 6.8 |
| | buffer pH 10 | -1 / +3 | | 8.0 / 6.7 |
| 4a. TAP sensor with 0.55 mm TG-2000 | 3 M KCl | -3 / -2 | 3 / 2 | 6.1 / 6.9 |
| | buffer pH 4 | -2 / -2 | | 9.2 / 8.4 |
| | buffer pH 7 | -1 / -2 | | 8.6 / 7.0 |
| | buffer pH 10 | ±0 / ±0 | | 8.4 / 7.2 |
| 4b. TAP sensor with 0.55 mm TG-2000 | 3 M KCl | -3 / +2 | 4 / 2 | 6.2 / 5.6 |
| | buffer pH 4 | -3 / +1 | | 6.9 / 6.2 |
| | buffer pH 7 | -2 / +2 | | 6.6 / 5.5 |
| | buffer pH 10 | +1 / +3 | | 6.3 / 5.5 |
| 4c. TAP sensor with 0.55 mm TG-2000 | 3 M KCl | -3 / -2 | 3 / 1 | 10.2 / 8.2 |
| | buffer pH 4 | -3 / -2 | | 10.8 / 8.2 |
| | buffer pH 7 | -2 / -2 | | 10.4 / 7.9 |
| | buffer pH 10 | ±0 / -1 | | 10.0 / 7.9 |
| 5a. TAP sensor with 0.35 mm TG-500 | 3 M KCl | -3 / -2 | 4 / 3 | 7.8 / 6.6 |
| | buffer pH 4 | -3 / -2 | | 8.0 / 6.8 |
| | buffer pH 7 | -1 / -2 | | 7.8 / 6.5 |
| | buffer pH 10 | +1 / +1 | | 7.7 / 6.4 |
| 6a. Polyplast sensor with 0.35 mm TG-500 | 3 M KCl | -3 / -1 | 5 / 3 | 7.7 / 6.6 |
| | buffer pH 4 | -2 / -2 | | 8.0 / 7.1 |
| | buffer pH 7 | -1 / -1 | | 7.7 / 6.7 |
| | buffer pH 10 | +2 / +1 | | 7.6 / 6.6 |

FIG. 4B

| SENSOR | FLUID TO BE MEASURED<br>BUFFER DILUTED 1:10 | $U_{DIFF}$/mV<br>n. 0 / ~30 | $\Delta U_{DIFF}$/mV<br>n. 0 / ~30 | $R_{REF}$/kOhm<br>n. 0 / ~30 |
|---|---|---|---|---|
| 0b. TAP sensor with 0.35 mm TG-500 | 3 M KCl und.<br>buffer pH 4<br>buffer pH 7<br>buffer pH 10 | -3 / -2<br>- / -3<br>- / -2<br>- / -2 | - / 1 | 10.5 / 8.5<br>- / 14.1<br>- / 9.4<br>- / 9.4 |
| 0c. TAP sensor with 0.35 mm TG-500 | 3 M KCl und.<br>buffer pH 4<br>buffer pH 7<br>buffer pH 10 | -3 / -2<br>- / -2<br>- / -3<br>- / -1 | - / 2 | 8.0 / 6.7<br>- / 11.6<br>- / 8.3<br>- / 8.0 |
| 1a. TAP sensor with 2x 0.35 mm TG-500 | 3 M KCl und.<br>buffer pH 4<br>buffer pH 7<br>buffer pH 10 | -3 / +1<br>- / ±0<br>- / -1<br>- / +2 | - / 3 | 12.5 / 5.3<br>- / 14.7<br>- / 10.4<br>- / 7.9 |
| 1b. TAP sensor with 2x 0.35 mm TG-500 | 3 M KCl und.<br>buffer pH 4<br>buffer pH 7<br>buffer pH 10 | -3 / -2<br>- / -2<br>- / -1<br>- / ±0 | - / 2 | 12.2 / 8.0<br>- / 14.7<br>- / 10.8<br>- / 9.7 |
| 1c. TAP sensor with 2x 0.35 mm TG-500 | 3 M KCl und.<br>buffer pH 4<br>buffer pH 7<br>buffer pH 10 | -3 / ±0<br>- / -1<br>- / ±0<br>- / +1 | - / 2 | 8.6 / 6.8<br>- / 13.4<br>- / 8.5<br>- / 8.0 |
| 2a. Polyplast sensor with 0.35 mm TG-500 | 3 M KCl und.<br>buffer pH 4<br>buffer pH 7<br>buffer pH 10 | -3 / -2<br>- / -3<br>- / -2<br>- / -1 | - / 2 | 9.4 / 7.2<br>- / 13.4<br>- / 9.2<br>- / 9.0 |
| 2b. Polyplast sensor with 0.35 mm TG-500 | 3 M KCl und.<br>buffer pH 4<br>buffer pH 7<br>buffer pH 10 | -3 / -2<br>- / -2<br>- / -1<br>- / ±0 | - / 2 | 10.2 / 7.9<br>- / 15.4<br>- / 9.6<br>- / 9.7 |
| 2c. Polyplast sensor with 0.35 mm TG-500 | 3 M KCl und.<br>buffer pH 4<br>buffer pH 7<br>buffer pH 10 | -3 / -2<br>- / -2<br>- / -1<br>- / ±0 | - / 2 | 10.5 / 8.9<br>- / 15.2<br>- / 10.6<br>- / 10.1 |

FIG. 5A

| SENSOR | FLUID TO BE MEASURED<br>BUFFER DILUTED 1:10 | $U_{DIFF}$/mV<br>n. 0 / ~30 | $\Delta U_{DIFF}$/mV<br>n. 0 / ~30 | $R_{REF}$/kOhm<br>n. 0 / ~30 |
|---|---|---|---|---|
| 3a. TAP sensor with 0.50 mm TG-500 | 3 M KCl und.<br>buffer pH 4<br>buffer pH 7<br>buffer pH 10 | -4 / +2<br>- / ±0<br>- / +2<br>- / +3 | - / 3 | 13.7 / 6.6<br>- / 12.2<br>- / 9.2<br>- / 8.6 |
| 3b. TAP sensor with 0.50 mm TG-500 | 3 M KCl und.<br>buffer pH 4<br>buffer pH 7<br>buffer pH 10 | -4 / ±0<br>- / -1<br>- / -1<br>- / +1 | - / 2 | 8.2 / 7.0<br>- / 13.7<br>- / 10.4<br>- / 8.9 |
| 3c. TAP sensor with 0.50 mm TG-500 | 3 M KCl und.<br>buffer pH 4<br>buffer pH 7<br>buffer pH 10 | -4 / ±0<br>- / -1<br>- / ±0<br>- / +1 | - / 2 | 9.2 / 7.2<br>- / 12.3<br>- / 8.3<br>- / 8.4 |
| 4a. TAP sensor with 0.55 mm TG-2000 | 3 M KCl und.<br>buffer pH 4<br>buffer pH 7<br>buffer pH 10 | -3 / -2<br>- / -3<br>- / -2<br>- / -1 | - / 2 | 6.1 / 6.9<br>- / 13.2<br>- / 10.0<br>- / 8.8 |
| 4b. TAP sensor with 0.55 mm TG-2000 | 3 M KCl und.<br>buffer pH 4<br>buffer pH 7<br>buffer pH 10 | -3 / +2<br>- / -1<br>- / ±0<br>- / +2 | - / 3 | 6.2 / 5.6<br>- / 10.4<br>- / 7.8<br>- / 7.2 |
| 4c. TAP sensor with 0.55 mm TG-2000 | 3 M KCl und.<br>buffer pH 4<br>buffer pH 7<br>buffer pH 10 | -3 / -2<br>- / -3<br>- / -3<br>- / -2 | - / 1 | 10.2 / 8.2<br>- / 15.0<br>- / 10.3<br>- / 9.3 |
| 5a. TAP sensor with 0.35 mm TG-500 | 3 M KCl und.<br>buffer pH 4<br>buffer pH 7<br>buffer pH 10 | -3 / -2<br>- / -4<br>- / -3<br>- / -1 | - / 3 | 7.8 / 6.6<br>- / 12.5<br>- / 8.5<br>- / 7.7 |
| 6a. Polyplast sensor with 0.35 mm TG-500 | 3 M KCl und.<br>buffer pH 4<br>buffer pH 7<br>buffer pH 10 | -3 / -1<br>- / -2<br>- / -2<br>- / -1 | - / 1 | 7.7 / 6.6<br>- / 12.7<br>- / 8.9<br>- / 7.8 |

FIG. 5B

| SENSOR | FLUID TO BE MEASURED BUFFER DILUTED 1:100 | $U_{DIFF}$/mV n. 0 / ~30 | $\Delta U_{DIFF}$/mV n. 0 / ~30 | $R_{REF}$/kOhm n. 0 / ~30 |
|---|---|---|---|---|
| 0b. TAP sensor with 0.35 mm TG-500 | 3 M KCl und. | -3 / -2 | - / 0 | 10.5 / 8.5 |
| | buffer pH 4 | - / -2 | | - / 24.6 |
| | buffer pH 7 | - / -2 | | - / 17.0 |
| | buffer pH 10 | - / -2 | | - / 13.7 |
| 0c. TAP sensor with 0.35 mm TG-500 | 3 M KCl und. | -3 / -2 | - / 1 | 8.0 / 6.7 |
| | buffer pH 4 | - / -3 | | - / 23.0 |
| | buffer pH 7 | - / -3 | | - / 13.6 |
| | buffer pH 10 | - / -2 | | - / 13.3 |
| 1a. TAP sensor with 2x 0.35 mm TG-500 | 3 M KCl und. | -3 / +1 | - / 0 | 12.5 / 5.3 |
| | buffer pH 4 | - / +1 | | - / 26.3 |
| | buffer pH 7 | - / +1 | | - / 17.7 |
| | buffer pH 10 | - / +1 | | - / 14.3 |
| 1b. TAP sensor with 2x 0.35 mm TG-500 | 3 M KCl und. | -3 / -2 | - / 1 | 12.2 / 8.0 |
| | buffer pH 4 | - / -1 | | - / 27.8 |
| | buffer pH 7 | - / -1 | | - / 18.6 |
| | buffer pH 10 | - / -1 | | - / 16.3 |
| 1c. TAP sensor with 2x 0.35 mm TG-500 | 3 M KCl und. | -3 / ±0 | - / 1 | 8.6 / 6.8 |
| | buffer pH 4 | - / ±0 | | - / 23.7 |
| | buffer pH 7 | - / ±0 | | - / 15.4 |
| | buffer pH 10 | - / +1 | | - / 13.4 |
| 2a. Polyplast sensor with 0.35 mm TG-500 | 3 M KCl und. | -3 / -2 | - / 1 | 9.4 / 7.2 |
| | buffer pH 4 | - / -3 | | - / 22.5 |
| | buffer pH 7 | - / -2 | | - / 17.7 |
| | buffer pH 10 | - / -2 | | - / 13.7 |
| 2b. Polyplast sensor with 0.35 mm TG-500 | 3 M KCl und. | -3 / -2 | - / 1 | 10.2 / 7.9 |
| | buffer pH 4 | - / -2 | | - / 25.3 |
| | buffer pH 7 | - / -2 | | - / 20.2 |
| | buffer pH 10 | - / -1 | | - / 16.1 |
| 2c. Polyplast sensor with 0.35 mm TG-500 | 3 M KCl und. | -3 / -2 | - / 1 | 10.5 / 8.9 |
| | buffer pH 4 | - / -2 | | - / 27.1 |
| | buffer pH 7 | - / -2 | | - / 20.6 |
| | buffer pH 10 | - / -1 | | - / 16.3 |

FIG. 6A

| SENSOR | FLUID TO BE MEASURED BUFFER DILUTED 1:100 | $U_{DIFF}$/mV n. 0 / ~30 | $\Delta U_{DIFF}$/mV n. 0 / ~30 | $R_{REF}$/kOhm n. 0 / ~30 |
|---|---|---|---|---|
| 3a. TAP sensor with 0.50 mm TG-500 | 3 M KCl und.<br>buffer pH 4<br>buffer pH 7<br>buffer pH 10 | -4 / +2<br>- / +3<br>- / +2<br>- / +3 | - / 1 | 13.7 / 6.6<br>- / 22.5<br>- / 15.2<br>- / 11.8 |
| 3b. TAP sensor with 0.50 mm TG-500 | 3 M KCl und.<br>buffer pH 4<br>buffer pH 7<br>buffer pH 10 | -4 / ±0<br>- / -2<br>- / -1<br>- / ±0 | - / 2 | 8.2 / 7.0<br>- / 24.0<br>- / 18.6<br>- / 15.2 |
| 3c. TAP sensor with 0.50 mm TG-500 | 3 M KCl und.<br>buffer pH 4<br>buffer pH 7<br>buffer pH 10 | -4 / ±0<br>- / -1<br>- / ±0<br>- / ±0 | - / 1 | 9.2 / 7.2<br>- / 21.9<br>- / 14.3<br>- / 12.6 |
| 4a. TAP sensor with 0.55 mm TG-2000 | 3 M KCl und.<br>buffer pH 4<br>buffer pH 7<br>buffer pH 10 | -3 / -2<br>- / -3<br>- / -2<br>- / -2 | - / 1 | 6.1 / 6.9<br>- / 23.4<br>- / 17.5<br>- / 13.3 |
| 4b. TAP sensor with 0.55 mm TG-2000 | 3 M KCl und.<br>buffer pH 4<br>buffer pH 7<br>buffer pH 10 | -3 / +2<br>- / -1<br>- / ±0<br>- / +1 | - / 2 | 6.2 / 5.6<br>- / 21.6<br>- / 14.9<br>- / 12.3 |
| 4c. TAP sensor with 0.55 mm TG-2000 | 3 M KCl und.<br>buffer pH 4<br>buffer pH 7<br>buffer pH 10 | -3 / -2<br>- / -2<br>- / -3<br>- / -2 | - / 1 | 10.2 / 8.2<br>- / 24.5<br>- / 18.1<br>- / 14.7 |
| 5a. TAP sensor with 0.35 mm TG-500 | 3 M KCl und.<br>buffer pH 4<br>buffer pH 7<br>buffer pH 10 | -3 / -2<br>- / -3<br>- / -3<br>- / -3 | - / 1 | 7.8 / 6.6<br>- / 21.5<br>- / 13.8<br>- / 12.4 |
| 6a. Polyplast sensor with 0.35 mm TG-500 | 3 M KCl und.<br>buffer pH 4<br>buffer pH 7<br>buffer pH 10 | -3 / -1<br>- / -2<br>- / -2<br>- / -2 | - / 1 | 7.7 / 6.6<br>- / 22.9<br>- / 16.7<br>- / 13.3 |

FIG. 6B

| SENSOR WITH THICKENED ELECTROLYTE AFTER 7 DAYS OF APPLCIATION | EXTRACTION VOLUME (g) | POTASSIUM (mg/day) ICP-MS | POTASSIUM (mg/day) CONV. VIA COND. |
|---|---|---|---|
| 0b. T-TG500-35-B TAP sensor with 0.35 mm TG-500 | 49.95 | - | 0.646 |
| 0c. T-TG500-35-C TAP sensor with 0.35 mm TG-500 | 49.99 | - | 0.399 |
| 1a. T-TG500-70-A TAP sensor with 2x 0.35 mm TG-500 | 49.43 | - | 0.278 |
| 1b. T-TG500-70-B TAP sensor with 2x 0.35 mm TG-500 | 49.4 | - | 0.293 |
| 1c. T-TG500-70-C TAP sensor with 2x 0.35 mm TG-500 | 50.71 | - | 0.297 |
| 2a. P-TG500-35-A Polyplast sensor with 0.35 mm TG-500 | 51.99 | - | 0.500 |
| 2b. P-TG500-35-B Polyplast sensor with 0.35 mm TG-500 | 50.68 | - | 0.460 |
| 2c. P-TG500-35-C Polyplast sensor with 0.35 mm TG-500 | 50.66 | - | 0.679 |
| 3a. T-TG500-50-A TAP sensor with 0.50 mm TG-500 | 50.37 | - | 0.386 |
| 3a. T-TG500-50-A TAP sensor with 0.50 mm TG-500 | 50.37 | - | 0.386 |
| 3b. T-TG500-50-B TAP sensor with 0.50 mm TG-500 | 51.3 | - | 0.351 |
| 3c. T-TG500-50-C TAP sensor with 0.50 mm TG-500 | 50.33 | - | 0.391 |

FIG. 7A

| SENSOR WITH CONDENSED ELECTROLYTE AFTER 7 DAYS OF APPLCIATION | EXTRACTION VOLUME (g) | POTASSIUM (mg/day) ICP-MS | POTASSIUM (mg/day) CONV. VIA COND. |
|---|---|---|---|
| 4a. T-TG2000-55-A TAP sensor with 0.55 mm TG-2000 | 50.41 | 0.27 | 0.258 |
| 4b. T-TG2000-55-B TAP sensor with 0.55 mm TG-2000 | 51.02 | 0.26 | 0.276 |
| 4c. T-TG2000-55-C TAP sensor with 0.55 mm TG-2000 | 50.07 | 0.24 | 0.252 |
| 5a. T-TG500-35-0 TAP sensor with 0.35 mm TG-500 | 50.51 | - | 0.425 |
| 6a. P-TG500-35-0 Polyplast sensor with 0.35 mm TG-500 | 50.51 | - | 0.499 |

FIG. 7B

COMBINATION ELECTRODE HAVING A HYDROGEL DIAPHRAGM

CROSS REFERENCE TO RELATED APPLICATION

This application is filed under 35 U.S.C. § 111(a) and is based on and hereby claims priority under 35 U.S.C. § 120 and § 365(c) from International Application No. PCT/EP2019/084408, filed on Dec. 10, 2019, and published as WO 2020/120467 A1 on Jun. 18, 2020, which in turn claims priority from German Application No. 102018132108.2, filed in Germany on Dec. 13, 2018. This application is a continuation-in-part of International Application No. PCT/EP2019/084408, which is a continuation of German Application No. 102018132108.2. International Application No. PCT/EP2019/084408 is pending as of the filing date of this application, and the United States is an elected state in International Application No. PCT/EP2019/084408. This application claims the benefit under 35 U.S.C. § 119 from German Application No. 102018132108.2. The disclosure of each of the foregoing documents is incorporated herein by reference.

TECHNICAL FIELD

The invention relates to a combination electrode and to a method for producing the combination electrode.

BACKGROUND

A combination electrode refers to a combination of a working electrode and a reference electrode that are housed in a single rod. The term measuring electrode is used synonymously for the term working electrode. The combination electrode can be, for example, a redox sensor or a pH combination electrode that can be used to determine the pH. The pH combination electrode can, for example, be a pH glass electrode.

The reference electrode is often a metal wire immersed in a saline solution. The reference electrode is often a silver-silver chloride electrode that has a silver wire sheathed by an AgCl layer, the silver wire with the AgCl layer being immersed in a KCl solution. The KCl solution is retained by a diaphragm. When the combination electrode is in operation, the diaphragm comes into contact with the fluid to be measured. The diaphragm prevents the intermixing of the KCl solution and the fluid to be measured, but allows for a charge transport between the KCl solution and the fluid to be measured. The diaphragm is conventionally porous so as to allow for the charge transport. A disadvantage of a conventional diaphragm, however, is that the diaphragm has a large surface area due to its porous structure, which tends to become progressively contaminated over time. The contamination hampers the charge transport, which results in errors in the measurements carried out using the combination electrode.

In addition, another disadvantage is that a conventional diaphragm allows KCl to flow out of the combination electrode through the diaphragm, which is noticeable by the efflorescence of KCl on the outer side of the diaphragm. The leakage of KCl leads to a change in the KCl concentration of the KCl solution, which in turn leads to a change in the electrochemical potential of the reference electrode. The changing electrochemical potential causes measurements that are carried out using the combination electrode to be erroneous. Even if only a small amount of KCl flows out of the combination electrode, erroneous measurements begin to occur after the passage of time. In order to reduce the loss of KCl from the combination electrode that leaks out through the diaphragm, a conventional combination electrode must be stored in a liquid that keeps the diaphragm moist. Due to the ongoing contamination and the continuing KCl outflow, a conventional combination electrode therefore has a limited service life within which it can carry out error-free measurements.

A combination electrode is therefore sought that has an extended service life in which error-free measurements can be made.

SUMMARY

The invention relates to a combination electrode, preferably a pH glass electrode, for measuring a fluid to be measured. The combination electrode has a working electrode, a reference electrode, a first electrically conductive fluid, and a diaphragm preferably made of a thermoplastic polyurethane block copolymer. The first electrically conductive fluid is in contact with the reference electrode and the diaphragm such that the diaphragm is coupled to the reference electrode in an electrically conductive manner via the first electrically conductive fluid. In one embodiment, the diaphragm is made of a hydrogel. The invention further relates to a method for producing the combination electrode.

A combination electrode for measuring the pH of a fluid includes a working electrode, a reference electrode, a hydrogel diaphragm, an outer tube and an inner tube disposed inside the outer tube. The working electrode is disposed in the inner tube. A reference chamber is formed between the inner tube and the outer tube. The reference electrode is disposed in the reference chamber. The hydrogel diaphragm seals the opening between an end of the outer tube and the inner tube when the hydrogel swells upon coming in contact with a first electrically conductive fluid that is introduced into the reference chamber. The hydrogel is preferably a thermoplastic polyurethane block copolymer. The block copolymer includes a monomer A and a monomer B that have a ratio by weight (ratio monomer B/monomer A) that ranges from twenty to one hundred. The block copolymer has an average molar mass that ranges from $50*10^3$ g/mol to $180*10^3$ g/mol. The hydrogel diaphragm is coupled to the reference electrode in an electrically conductive manner through the first electrically conductive fluid, which contacts both the reference electrode and the diaphragm. The inner tube has a first inner tube longitudinal end that is closed by a glass membrane. A second electrically conductive fluid contacts the glass membrane and the working electrode. The glass membrane is coupled to the working electrode in an electrically conductive manner through the second electrically conductive fluid.

A novel method of producing a combination electrode for measuring pH uses a diaphragm made of a hydrogel. The hydrogel is preferably a thermoplastic polyurethane. An inner tube is arranged inside an outer tube, and a reference chamber is formed between the inner tube and the outer tube. An opening between the inner tube and the outer tube is formed at a first outer tube longitudinal end of the outer tube. A working electrode is inserted into the inner tube. A reference electrode is inserted into the reference chamber. A hydrogel diaphragm in its dry state is introduced into the opening so as to form an end of the reference chamber. A first electrically conductive fluid is introduced into the reference chamber. The hydrogel diaphragm swells upon contacting the first electrically conductive fluid and thereby seals the opening. The hydrogel diaphragm is coupled to the reference electrode in an electrically conductive manner through the first electrically conductive fluid when the reference electrode is in contact with the first electrically conductive fluid.

The hydrogel diaphragm is disposed adjacent to the first outer tube longitudinal end, and a second outer tube longitudinal end is disposed opposite the first outer tube longitudinal end. In one embodiment, the first electrically conductive fluid is introduced into the reference chamber through the second outer tube longitudinal end. In another embodiment, the second outer tube longitudinal end is sealed before the first electrically conductive fluid is introduced into the reference chamber. The first outer tube longitudinal end of the outer tube is immersed into the first electrically conductive fluid so as to enable the first electrically conductive fluid to enter the reference chamber. Then the combination electrode together with the first electrically conductive fluid is placed into a vacuum container. The vacuum container is evacuated and then ventilated so that the first electrically conductive fluid enters the reference chamber through the opening.

The hydrogel diaphragm in its dry state has an outer diameter that is smaller than an inner diameter of the opening. The hydrogel diaphragm is under compressive stress in the opening and tightly seals the opening when the hydrogel swells in size after coming in contact with the first electrically conductive fluid.

The inner tube has a first inner tube longitudinal end that is closed with a glass membrane. A second electrically conductive fluid contacts the working electrode and the glass membrane. The working electrode is arranged in the inner tube such that the glass membrane is coupled to the working electrode in an electrically conductive manner through the second electrically conductive fluid.

Other embodiments and advantages are described in the detailed description below. This summary does not purport to define the invention. The invention is defined by the claims.

BRIEF DESCRIPTION OF THE DRAWING

The accompanying drawings, where like numerals indicate like components, illustrate embodiments of the invention.

FIG. 4A and FIG. 4B are a table listing the diffusion potential and reference resistance of various versions of the combination electrode of FIG. 1.

FIG. 5A and FIG. 5B are a table of measurements similar to those performed for FIGS. 4A-4B except with a buffer solution diluted to a ratio of 1:10.

FIG. 6A and FIG. 6B are a table of measurements similar to those performed for FIGS. 4A-4B except with a buffer solution diluted to a ratio of 1:100.

FIG. 7A and FIG. 7B are a table listing the outflow of potassium from the reference chamber of various versions of the combination electrode of FIG. 1.

DETAILED DESCRIPTION

Reference will now be made in detail to some embodiments of the invention, examples of which are illustrated in the accompanying drawings.

Figure 1:
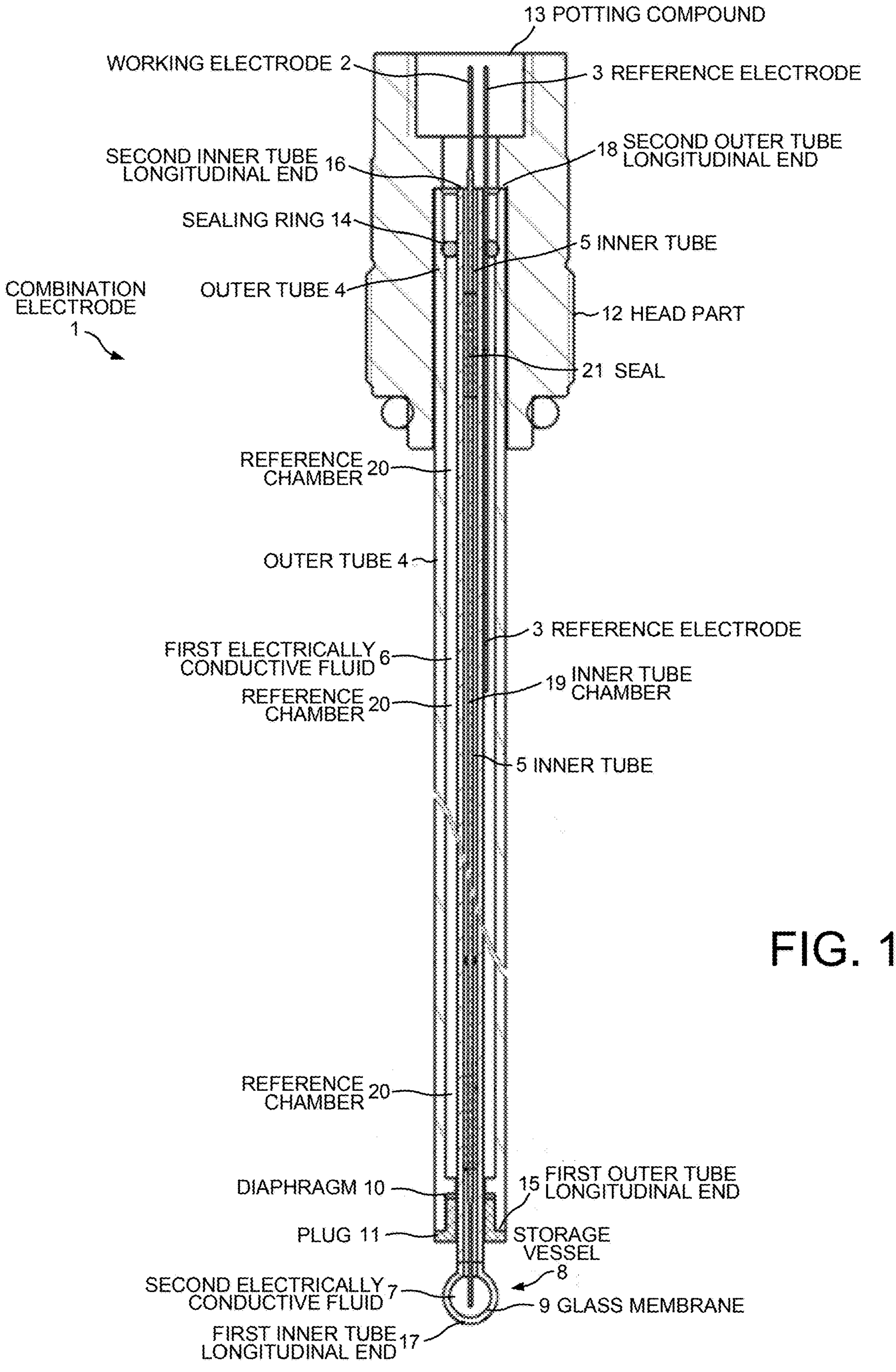
FIG. 1 is a longitudinal cross-section of a combination electrode.

FIG. 1 shows a novel combination electrode 1 for measuring a characteristic of a fluid, such as the pH of the fluid. The combination electrode 1 includes a working electrode 2, a reference electrode 3, a diaphragm 10, and a first electrically conductive fluid 6. The first electrically conductive fluid 6 is in contact with the reference electrode 3 and the diaphragm 10 such that the diaphragm 10 is coupled to the reference electrode 3 in an electrically conductive manner via the first electrically conductive fluid 6. The diaphragm 10 is made of a hydrogel.

The outflow or leakage of the first electrically conductive fluid 6 through the diaphragm 10 is much lower in the combination electrode 1 than in a conventional combination electrode with a porous diaphragm 10. However, the combination electrode 1 still allows a charge transport to flow between the first electrically conductive fluid 6 and the fluid that is to be measured. Due to the lack of pores in the hydrogel used to make the diaphragm 10, the hydrogel is less prone to contamination, which would hinder the charge transport. Due to the minimal leakage of the first electrically conductive fluid 6 and the reduced tendency of the hydrogel to become contaminated, the combination electrode 1 has a long service life during which error-free measurements can be made. In addition, the amount of the first electrically conductive fluid 6 flowing out of the combination electrode 1 through the diaphragm 10 is so low that it is not necessary to store the combination electrode 1 in a liquid. In addition, the hydrogel is elastic so that any expansion or contraction with temperature fluctuations is compensated by the elasticity of the hydrogel, and the combination electrode 1 remains sealed around the diaphragm 10. In addition, the combination electrode 1 is easy to produce because the hydrogel can be introduced into an opening in the combination electrode 1 in its smaller dry state. Then the hydrogel is brought into contact with the first electrically conductive fluid 6, whereby the hydrogel swells and seals the opening. The contact between the first electrically conductive fluid 6 and the hydrogel can take place simultaneously with the filling of the combination electrode 1 with the first electrically conductive hydrogel.

Due to the minimal KCl outflow, no crystals form on the diaphragm 10. This is a prerequisite for the combination electrode 1 to be compatible with GMP (good manufacturing practice) guidelines. It was also possible to show that the combination electrode 1 can be sterilized with gamma radiation without impairing the functionality of the combination electrode 1, in particular the diaphragm 10. The combination electrode 1 is therefore suitable for use in fermenters, in particular in disposable fermenters. The problem with conventional porous diaphragms is that in the event that the fluid to be measured contains sulfide, silver sulfide precipitates and clogs the pores of the diaphragm, which makes the charge transport between the first electrically conductive fluid 6 and the fluid to be measured difficult and thus leads to measurements having errors. However, in the case of the diaphragm 10 having the hydrogel, the silver sulfide still precipitates in the diaphragm, but this results in additional electrically conductive fluid, in particular water, now diffusing into the diaphragm. As a result, the diaphragm 10 continues to swell, which facilitates the charge transport between the first electrically conductive fluid 6 and the fluid to be measured.

In one embodiment, the hydrogel includes thermoplastic polyurethane. For example, the hydrogel can consist exclusively of thermoplastic polyurethane. Thermoplastic polyurethane is a block copolymer that includes the monomer A shown below

A

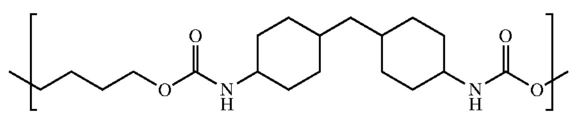

and a monomer B shown below

B

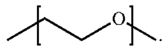

For both monomers A and B, the monomer includes the atoms between the left bracket and the right bracket. In the block copolymer, the left side of monomer A is bonded to an oxygen atom of another monomer. Alternatively, to terminate the block copolymer, a hydroxyl group is bonded to the left side of monomer A. The right side of monomer A is bonded to a carbon atom of another monomer.
Alternatively, to terminate the block copolymer, a hydrogen atom is bonded to the right side of monomer A. The left side of monomer B is bonded to an oxygen atom of another monomer. Alternatively, to terminate the block copolymer, a hydroxyl group atom is bonded to the left side of monomer B. The right side of monomer B is bonded to a carbon atom of another monomer. Alternatively, to terminate the block copolymer, a hydrogen atom is bonded to the right side of monomer B. The block copolymer can consist essentially of blocks of monomer A and blocks of monomer B and end groups for terminating the block copolymer. The end groups can be the aforementioned hydroxyl groups and/or the aforementioned hydrogen atoms.

The ratio by weight of monomer B to monomer A (ratio monomer B/monomer A) is from 20 to 100, and preferably from 30 to 90. The average molar mass $\overline{M}$ of the block copolymer is from $50*10^3$ g/mol to $180*10^3$ g/mol, and preferably from $80*10^3$ g/mol to $150*10^3$ g/mol. For the average molar mass M, the following applies:

$$\overline{M} = \frac{\sum_i^n Mi}{n},$$

where n is the number of polymer chains of the block copolymer, and Mi is the molar mass of the polymer chain i.

The block copolymer is commercially available under the brand name Tecophilic® from the company Lubrizol. Tecophilic® TG-500 and/or Tecophilic® TG-2000 can be used as the block copolymer. The ratio by weight of monomer B to monomer A is around 40 for Tecophilic® TG-500 and around 82 for Tecophilic® TG-2000. The average molar mass $\overline{M}$ of the block copolymer is around $1.4*10^5$ g/mol for Tecophilic® TG-500 and around $8*10^4$ g/mol for Tecophilic® TG-2000.

For example, the hydrogel can also include a polymer that is used to make soft contact lenses. Examples of the polymer include hydroxyethyl methacrylates, methyl methacrylates, vinyl pyrrolidones and/or silicone hydrogels. In one embodiment, the hydrogel is a thermoplastic elastomer. The hydrogel can be a smart hydrogel. For example, the smart hydrogel can be ionic strength-responsive and/or thermoresponsive. An example of a smart hydrogel that is both ionic strength-responsive and thermoresponsive is the aforementioned Tecophilic®. Another example of a smart hydrogel that is thermoresponsive is a polymer based on N-isopropyl acrylamide copolymers.

In contrast to other elastomers, the thermoplastic elastomer used for the hydrogel can be extruded into a film, and the diaphragm 10 can subsequently be punched out of the film. In contrast to conventional thermoplastics, the thermoplastic elastomer used for the hydrogel retains its elastic properties at room temperature. One example of the thermoplastic elastomer is the block copolymer described above.

In one embodiment, the hydrogel is a smart hydrogel that is responsive to stimuli, such as heat and ionic strength. Smart hydrogels are characterized in that they react to specific environmental conditions with pronounced volume changes. The smart hydrogel used to make diaphragm 10 is ionic strength-responsive and/or thermoresponsive. In the event that the smart hydrogel is ionic strength-responsive, the smart hydrogel swells even more in liquid with a lower salt concentration or conductivity. Thus, diaphragm 10 swells even more when in contact with the fluid to be measured when that fluid has a lower salt concentration or conductivity. One example of such an ionic strength-responsive smart hydrogel is the aforementioned block copolymer. A low salt concentration in the fluid to be measured results in more ions from the first electrically conductive fluid 6 diffusing into the fluid to be measured through the now increasingly swollen diaphragm 10. The increasing number of ions diffusing across the diaphragm 10 causes a decreasing diffusion potential between the first electrically conductive fluid 6 and the fluid to be measured and thus a higher measurement accuracy. The combination electrode 1 that includes the ionic strength-responsive smart hydrogel is therefore suitable for measuring ultrapure water. In the event that the smart hydrogel is thermoresponsive, it can be designed so that it shrinks as temperature increases. One example of such a thermoresponsive smart hydrogel is the aforementioned block copolymer. The shrinkage of the smart hydrogel based on temperature and ionic concentration causes the smart hydrogel to be less prone to contamination and reduces the outflow of ions from the first electrically conductive fluid 6, which increases the service life of the combination electrode 1 even at elevated temperatures. Another example of a smart hydrogel that is thermoresponsive is a polymer based on N-isopropyl acrylamide copolymers.

The first electrically conductive fluid 6 is contained in the reference chamber 20. The combination electrode 1 has an opening at a first outer tube longitudinal end 15 of the outer tube 4. The diaphragm 10 is arranged in the opening and seals the opening. The opening is sealed easily and tightly with the diaphragm 10 by first introducing the hydrogel in its dry state into the opening. After contact with the first electrically conductive fluid 6, the hydrogel swells and thus seals the opening.

The combination electrode 1 has an outer tube 4 and an inner tube 5 disposed within the outer tube 4. The reference chamber 20 is located between the outer tube 4 and the inner tube 5. The opening is an annular gap between the inner tube 5 and the outer tube 4 at the first outer tube longitudinal end 15. The diaphragm 10 made of hydrogel seals the opening. The hydrogel can easily be shaped into a ring, for example, by cutting and/or punching rings from a sheet of hydrogel, so that the hydrogel ring seals the annular gap.

The combination electrode 1 has a plug 11 that is permeable to the fluid being measured and that is arranged in the opening and supports the diaphragm 10. In order to ensure that the plug 11 is permeable to the fluid being measured, the plug has through-holes, grooves and/or is porous. The plug 11 can be arranged either on the side of the diaphragm 10 facing the reference chamber 20 or on the side of the diaphragm 10 facing away from the reference chamber 20. Alternatively, the plug 11 can have two portions, each arranged on opposite sides of the diaphragm 10. The plug 11 prevents the diaphragm 10 from escaping from the opening, in particular when the first electrically conductive fluid 6 is introduced into the reference chamber 20. The characteristics of the plug 11 can also be used to control the outflow of the first electrically conductive fluid 6 from the reference chamber 20 by selecting the diameter and/or number of through-holes, by selecting the size of the groove or grooves, by selecting the porosity of the plug 11 and/or by selecting the dimensions of the plug 11.

FIG. 1 shows that the inner tube 5 has a closed first inner tube longitudinal end 17 and a glass membrane 9 at the closed end. The working electrode 2 and a second electrically conductive fluid 7 that contacts the glass membrane 9 are disposed in the inner tube 5 such that the glass membrane 9 is coupled to the working electrode 2 in an electrically conductive manner via the second electrically conductive fluid 7.

In one embodiment, the combination electrode 1 is a pH combination electrode. The pH combination electrode can be a pH glass electrode. In another embodiment, the combination electrode 1 is a redox sensor.

The first electrically conductive fluid 6 can be an aqueous KCl solution, for example, an aqueous 3M KCl solution. Alternatively, the first electrically conductive fluid 6 can be a highly viscous liquid. For example, the aqueous KCl solution, in particular the aqueous 3M KCl solution, can in this case be thickened with a thickener, in particular hydroxyethyl cellulose. The hydroxyethyl cellulose is commercially available, for example, under the trade name Natrosol. Alternatively, the first electrically conductive fluid 6 can be strongly solidified. For this purpose, a monomer mixture is introduced into the combination electrode 1 and polymerized to form a polymer. The polymer can be, for example, a polymer that is obtained by polymerizing N-acryloylaminoethoxyethanol or by copolymerizing N-acryloylaminoethoxyethanol with a hydroxyalkyl methacrylate, as described, for example, in WO 2005/073704 A1.

The thickness of the diaphragm 10 ranges from 0.1 mm to 1.0 mm, and preferably from 0.35 mm to 0.7 mm. It was found that within the preferred thickness range, the outflow of KCl from the combination electrode 1 is low, but yet the charge exchange between the first electrically conductive fluid 6 and the fluid to be measured is high enough so that error-free measurements can be carried out.

A novel method for producing the combination electrode 1 involves inserting a hydrogel ring in its dry state into the annular gap at the first outer tube longitudinal end 15 of the outer tube 4. In a first step of the novel method, the inner tube 5 is arranged within the outer tube 4 forming a reference chamber 20 between the outer tube 4 and the inner tube 5. The opening of the annular gap is defined by the outer tube 4 and the inner tube 5. In a next step, the working electrode 2 is arranged within the inner tube 5, and the reference electrode 3 is arranged within the outer tube 4. In a next step, hydrogel in the form of diaphragm 10 is inserted in its dry state into the opening and delimits the reference chamber 20. The hydrogel forms the lower end of the reference chamber 20. In a next step, the first electrically conductive fluid 6 is introduced into the reference chamber 20 and contacts the hydrogel. The hydrogel thereby swells and forms the diaphragm 10, which seals the opening. The first electrically conductive fluid 6 comes in contact with the reference electrode 3 such that the diaphragm 10 becomes coupled to the reference electrode 3 in an electrically conductive manner via the first electrically conductive fluid 6.

The novel method enables the opening between the inner tube 5 and the outer tube 4 at the first outer tube longitudinal end 15 to be sealed easily and tightly. The combination electrode 1 produced by the novel method has a long service life during which error-free measurements can be carried out. The working electrode 2 can be inserted into the inner tube 5, and the reference electrode 3 can be inserted into the outer tube 4 both before or after the hydrogel is inserted into the opening.

The combination electrode 1 is preferably designed so that the first outer tube longitudinal end 15 of the outer tube 4 is near to where the diaphragm 10 is secured by the plug 11. In one embodiment, the first electrically conductive fluid 6 is introduced into the reference chamber 20 through a second outer tube longitudinal end 18 of the outer tube 4.

In another embodiment of the novel method, the outer tube 4 has the first outer tube longitudinal end 15 near to where the diaphragm 10 is located between the outer tube 4 and the inner tube 5. In a first step, the second outer tube longitudinal end 18 is sealed before the first electrically conductive fluid 6 is introduced into the reference chamber 20. Then, in order to introduce the first electrically conductive fluid 6 into the reference chamber 20, the first outer tube longitudinal end 15 is immersed into the first electrically conductive fluid 6. In a next step, the combination electrode 1, together with the first electrically conductive fluid 6, is placed in a vacuum container, and the vacuum container is evacuated and then ventilated so that the first electrically conductive fluid 6 enters the reference chamber 20 through the opening and through the hydrogel diaphragm 10.

This is a simple method for filling the reference chamber 20. Moreover, a plurality of the combination electrodes can be simultaneously immersed in the first electrically conductive fluid 6 and together placed in the vacuum container for evacuating and ventilating. As a result, the first electrically conductive fluid 6 can be simultaneously introduced into the plurality of combination electrodes, making the method cost-effective. The vacuum container is evacuated down to a pressure of 50 mbar to 100 mbar, preferably about 80 mbar.

The inner tube 5 has the first inner tube longitudinal end 17 that is designed to be closed. The glass membrane 9 is disposed at the first inner tube longitudinal end 17. The working electrode 2 and the second electrically conductive fluid 7, which contacts both the glass membrane 9 and the working electrode 2, are arranged in the inner tube 5 such that the glass membrane 9 is coupled to the working electrode 2 in an electrically conductive manner via the second electrically conductive fluid 7. The first inner tube longitudinal end 17 is adjacent to the first outer tube longitudinal end 15.

When the hydrogel ring in its dry state is introduced into the opening, the hydrogel ring is dimensioned to be smaller than the annular opening. After the first electrically conductive fluid 6 is introduced into the reference chamber 20, the diaphragm 10 is formed under compressive stress. As a result, the opening is tightly sealed.

In order to ensure that the compressive stress is created, preliminary tests of hydrogels of various sizes are performed. In their dry state, the hydrogels are all smaller than the opening. After the hydrogels come in contact with the first electrically conductive fluid 6, the hydrogels swell. In the preliminary tests, the size of the variously sized hydrogels in their swollen state is determined, and only hydrogels of those sizes that are larger than the opening in their swollen state are used for the diaphragm 10. Only those hydrogels should be used whose sizes in their swollen states are from 10% to 100% larger than the opening and preferably from 30% to 50% larger than the opening. The degree of swelling Q of the hydrogel can be from 115% to 1000%, preferably from 150% to 800%, and more preferably from 180% to 350%. The degree of swelling Q is defined as $Q=(V_Q-V_T)/V_T$, wherein $V_T$ is the volume of the hydrogel in its dry state and $V_Q$ is the volume of the hydrogel in its swollen state after the swelling with the first electrically conductive fluid 6.

The combination electrode 1 can be a pH combination electrode and/or a redox sensor. The pH combination electrode can be a pH glass electrode.

As can be seen from FIG. 1, the combination electrode 1 includes the working electrode 2, the reference electrode 3, the diaphragm 10, and the first electrically conductive fluid 6 for measuring a fluid to be measured. The first electrically conductive fluid 6 is in contact with the reference electrode 3 and the diaphragm 10 such that the diaphragm 10 is coupled to the reference electrode 3 in an electrically conductive manner via the first electrically conductive fluid 6. In order to carry out a measurement in an operation of the combination electrode 1, the side of the diaphragm 10 facing away from the first electrically conductive fluid 6 must be in contact with the fluid to be measured. The diaphragm 10 prevents the intermixing of the first electrically conductive fluid 6 with the fluid to be measured but permits a charge transport between the first electrically conductive fluid 6 and the fluid to be measured. In addition, the combination electrode 1 has a glass membrane 9 and a second electrically conductive fluid 7 that couples the glass membrane 9 to the working electrode 2 in an electrically conductive manner. The first electrically conductive fluid 6 and the second electrically conductive fluid 7 are electrically isolated from one another. In order to measure the fluid to be measured, the fluid to be measured must be in contact with the side of the glass membrane 9 opposite the second electrically conductive fluid 7 in the storage vessel 8. An electrical voltage differential is then measured between the working electrode 2 and the reference electrode 3.

In one embodiment, the diaphragm 10 includes a hydrogel and can consist essentially of the hydrogel. The hydrogel can be a thermoplastic polyurethane. The thermoplastic polyurethane can be a block copolymer that includes a monomer A

A

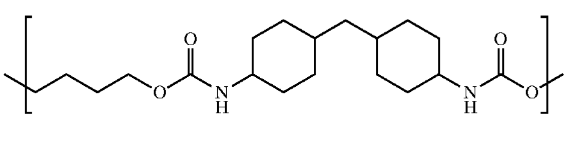

and a monomer B:

B

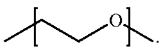

For both monomers A and B, the monomer includes the atoms between the left bracket and the right bracket. In the block copolymer, the left side of monomer A is bonded to an oxygen atom of another monomer. Alternatively, to terminate the block copolymer, a hydroxyl group is bonded to the left side of monomer A. The right side of monomer A is bonded to a carbon atom of another monomer.

Alternatively, to terminate the block copolymer, a hydrogen atom is bonded to the right side of monomer A. The left side of monomer B is bonded to an oxygen atom of another monomer. Alternatively, to terminate the block copolymer, a hydroxyl group atom is bonded to the left side of monomer B. The right side of monomer B is bonded to a carbon atom of another monomer. Alternatively, to terminate the block copolymer, a hydrogen atom is bonded to the right side of monomer B. The block copolymer can consist essentially of blocks of monomer A and blocks of monomer B and end groups for terminating the block copolymer. The end groups can be the aforementioned hydroxyl groups and/or the aforementioned hydrogen atoms.

The ratio by weight of the monomer B to the monomer A (ratio monomer B/monomer A) is from 20 to 100, and preferably from 30 to 90. The average molar mass $\overline{M}$ of the block copolymer is from $50*10^3$ g/mol to $180*10^3$ g/mol, and preferably from $80*10^3$ g/mol to $150*10^3$ g/mol. For the average molar mass $\overline{M}$, the following applies:

$$\overline{M} = \frac{\sum_i^n Mi}{n},$$

wherein n is the number of polymer chains of the block copolymer and Mi is the molar mass of the polymer chain i.

The block copolymer is commercially available under the brand name Tecophilic® from the company Lubrizol. Tecophilic® TG-500 and/or Tecophilic® TG-2000 can be used as the block copolymer. The ratio by weight of the monomer B to the monomer A is approximately 40 for Tecophilic® TG-500 and approximately 82 for Tecophilic® TG-2000. The average molar mass M of the block copolymer is approximately $1.4*10^5$ g/mol for Tecophilic® TG-500 and approximately $8*10^4$ g/mol for Tecophilic® TG-2000.

For example, the hydrogel can also include a polymer that is used to make soft contact lenses. Examples of this are hydroxyethyl methacrylates, vinyl pyrrolidones and/or silicone hydrogels. In one embodiment, the hydrogel is a thermoplastic elastomer. The hydrogel can be a smart hydrogel. For example, the smart hydrogel can be ionic strength-responsive and/or thermoresponsive. A smart hydrogel that is thermoresponsive swells and/or shrinks more at a higher temperature. There can be a transition temperature at which the hydrogel changes its behavior between swelling and shrinking. An example of a smart hydrogel that is both ionic strength-responsive and thermoresponsive is the aforementioned Tecophilic®. Another example of a smart hydrogel that is thermoresponsive is a polymer based on N-isopropyl acrylamide copolymers.

The thickness of the diaphragm 10 ranges from 0.1 mm to 1.0 mm, and preferably from 0.35 mm to 0.7 mm.

FIG. 1 shows that the combination electrode 1 includes the outer tube 4 and the inner tube 5 disposed within the outer tube 4. The reference chamber 20, which contains the first electrically conductive fluid 6, is disposed between the outer tube 4 and the inner tube 5 and has the shape of an annular chamber. The combination electrode 1 has an opening in the form of an annular gap between the outer tube 4 and the inner tube 5 adjacent to the first outer tube longitudinal end 15. The diaphragm 10 is arranged in the opening and seals the opening.

FIG. 1 shows that the outer tube 4 has the first outer tube longitudinal end 15, and the inner tube 5 has the first inner tube longitudinal end 17. The first inner tube longitudinal end 17 is located near the first outer tube longitudinal end 15. The diaphragm 10 is located adjacent to the first outer tube longitudinal end 15, and the glass membrane 9 is disposed at the first inner tube longitudinal end 17.

The inner tube 5 has a second inner tube longitudinal end 16 that is located opposite the first inner tube longitudinal end 17. An inner tube space 19 is disposed inside the inner tube 5 between the first inner tube longitudinal end 17 and the second inner tube longitudinal end 16. The second electrically conductive fluid 7 is contained in the inner tube space 19. The inner tube 5 has a storage vessel 8 at its first inner tube longitudinal end 17. The interior of the storage vessel 8 forms part of the inner tube space 19. The storage vessel 8 has a larger internal cross section than the rest of the inner tube space 19 enabling a larger amount of the second electrically conductive fluid 7 to be contained in the inner tube 5 than without the storage vessel 8. The thickness of the diaphragm 10 is the dimension of the diaphragm 10 in the direction from the first inner tube longitudinal end 17 to the second inner tube longitudinal end 16.

In the embodiment in which the combination electrode 1 is a pH glass electrode, the second electrically conductive fluid 7 is an internal buffer. The internal buffer can be an aqueous KCl solution. For example, an acetate buffer and/or a phosphate buffer can be used as the internal buffer. The electrically conductive fluid 6 can be an aqueous solution, such as an aqueous KCl solution. In one implementation, the KCl concentration of the first electrically conductive fluid is 3 mol/l. The first electrically conductive fluid 6 can include the aqueous KCl solution together with either a thickener or a polymerized monomer mixture. The thickener thickens the aqueous KCl solution. One example of the thickener is hydroxyethyl cellulose. The polymerized monomer mixture can be, for example, a polymer that is obtained by polymerization of N-acryloylaminoethoxyethanol or by copolymerization of N-acryloylaminoethoxyethanol with a hydroxyalkyl methacrylate, as described, for example, in WO 2005/073704 A1.

Each of the working electrode 2 and the reference electrode 3 can be a silver-silver chloride electrode. The pH glass electrode would then have the following electrochemical series: Ag(s)| AgCl(s)| K+(aq)Cl−(aq)|| glass membrane 9|| fluid to be measured|| diaphragm 10|| K+(aq)Cl−(aq)| AgCl(s)| Ag(s). An electrical voltage can now be measured between the two Ag(s) elements. The pH of the fluid to be measured can be determined based on the electrical voltage differential between the two silver elements.

The combination electrode 1 includes the plug 11 that is disposed in the annular gap between the outer tube 4 and inner tube 5 on the side of the diaphragm 10 facing away from the reference chamber 20. The plug 11 supports the diaphragm 10. The plug 11 is permeable to the fluid to be measured. In order to render the plug 11 permeable, the plug can have one or more plug through-holes or grooves and/or the plug 11 can be porous.

FIG. 1 shows that the combination electrode 1 includes a seal 21 that is injected into the inner tube 5 and seals the top of the inner tube space 19. The second electrically conductive fluid 7 is thus contained between the first inner tube longitudinal end 17 and the seal 21. The seal 21 can be an adhesive, such as a silicone adhesive.

The combination electrode 1 includes a sealing ring 14 that is located near the second outer tube longitudinal end 18 in the annular gap between the outer tube 4 and the inner tube 5. The sealing ring 14 seals the reference chamber 20 at the top. The first electrically conductive fluid 6 is thus contained between the diaphragm 10 and the sealing ring 14.

FIG. 1 shows that the combination electrode 1 includes a head part 12 that encloses the outer tube 4 at its upper second outer tube longitudinal end 18. The head part 12 extends upward past the second outer tube longitudinal end 18. The head part 12 has a cavity in its interior that is filled with a potting compound 13. In addition to the sealing ring 14 and the seal 21, the potting compound 13 provides an additional seal that isolates the electrodes and chambers from the exterior environment. The potting compound 13 can be a silicone adhesive. By providing the potting compound 13, the working electrode 2 and the reference electrode 3 are electrically insulated from one another and from the environment.

A novel method for producing the combination electrode 1 includes the steps: providing the outer tube 4 and the inner tube 5, inserting the working electrode 2 and the reference electrode 3, filling the inner tube 5 with the second electrically conductive fluid 7, inserting a hydrogel ring into the opening adjacent to the first outer tube longitudinal end 15, and filling the reference chamber 20 with the first electrically conductive fluid 6. The outer tube 4 and the inner tube 5 are provided, and the inner tube 5 is inserted into the outer tube 4. A reference chamber 20 is formed between the outer tube 4 and the inner tube 5. An opening with the shape of an annular gap is disposed adjacent to the first outer tube longitudinal end 15 between the outer tube 4 and the inner tube 5. The working electrode 2 is inserted into the inner tube 5, and the reference electrode 3 is inserted into the reference chamber 20. The second electrically conductive fluid 7 is introduced into the inner tube 5. The second electrically conductive fluid 7 contacts both the glass membrane 9 and the working electrode 2 such that the glass membrane 9 is coupled with the working electrode 2 in an electrically conductive manner via the second electrically conductive fluid 7.

An annular diaphragm 10 made of hydrogel is inserted in its dry state into the opening between the outer tube 4 and the inner tube 5. The bottom of the reference chamber 20 is delimited by the hydrogel diaphragm 10. The first electrically conductive fluid 6 is introduced into the reference chamber 20 and thereby contacts the hydrogel, causing the hydrogel to swell. The swollen hydrogel forms the diaphragm 10 and seals the opening. The first electrically conductive fluid 6 also contacts the reference electrode 3 such that the diaphragm 10 is coupled to the reference electrode 3 in an electrically conductive manner via the first electrically conductive fluid 6.

The novel method further includes additional steps in order to prevent the second electrically conductive fluid 7 from escaping from the inner tube 5. The second inner tube longitudinal end 16 is sealed by the seal 21 and/or by the potting compound 13 of the head part 12.

In a first embodiment for introducing the first electrically conductive fluid 6 into the reference chamber 20, the first electrically conductive fluid 6 is introduced into the reference chamber 20 through the second outer tube longitudinal end 18. After the first electrically conductive fluid has been introduced into the reference chamber 20, and in order to prevent the first electrically conductive fluid 6 from escaping from the reference chamber 20 through the second outer tube longitudinal end 18, the second outer tube longitudinal end 18 is sealed using the sealing ring 14 and/or the head part 12 and the potting compound 13.

In a second embodiment for introducing the first electrically conductive fluid 6 into the reference chamber 20, the second outer tube longitudinal end 18 is sealed before the first electrically conductive fluid 6 is introduced into the reference chamber 20. Then, the first outer tube longitudinal end 15 is immersed into the first electrically conductive fluid 6 in order to introduce the first electrically conductive fluid 6 into the reference chamber 20. Then the combination electrode 1, together with the first electrically conductive fluid 6, is placed in a vacuum container. The vacuum container is evacuated and then ventilated so that the first electrically conductive fluid 6 enters the reference chamber 20 via the opening adjacent to the first outer tube longitudinal end 15. The second outer tube longitudinal end 18 can be sealed using the sealing ring 14 and/or the head part 12 and the potting compound 13. The vacuum container is evacuated down to a pressure of 50 mbar to 100 mbar, preferably to about 80 mbar.

The hydrogel diaphragm 10 can be inserted in its dry state into the opening in at least three ways. In a first alternative, the inner tube 5 is first placed inside the outer tube 4, and the hydrogel is subsequently inserted into the opening. In a second alternative, the hydrogel is first arranged around the inner tube 5, and then the inner tube 5, together with the hydrogel, is inserted into the outer tube 4. In a third alternative, the hydrogel ring is first inserted into the outer tube 4, and then the inner tube 4 is inserted into the outer tube and through the hydrogel ring.

When the hydrogel in its dry state is inserted into the opening, the diameter of the hydrogel ring can be smaller than the inner diameter of the outer tube 4 at the opening. After the first electrically conductive fluid 6 is introduced into the reference chamber 20, the diaphragm 10 is formed by the swollen hydrogel ring, and the diaphragm 10 comes under compressive stress from the inner walls of the outer tube 4. In order to ensure that the compressive stress is created and the diaphragm 10 forms a tight seal, preliminary tests of hydrogels of various sizes are performed.

In their dry state, the hydrogel rings are all smaller than the gap. After the hydrogel rings come in contact with the first electrically conductive fluid 6, the hydrogel rings swell. In the preliminary tests, the size of the variously sized hydrogel rings in their swollen state is determined, and only hydrogel rings whose diameters in their swollen state are larger than the inner diameter of the outer tube 4 at the opening are used for the diaphragm 10. Only those hydrogel rings should be used whose sizes in their swollen states are from 10% to 100% larger than the opening and preferably from 30% to 50% larger than the opening. The degree of swelling Q of the hydrogel rings can be from 115% to 1000%, preferably from 150% to 800%, and more preferably from 180% to 350%. The degree of swelling Q is defined as $Q=(V_Q-V_T)/V_T$, where $V_T$ is the volume of the hydrogel in its dry state, and $V_Q$ is the volume of the hydrogel in its swollen state after swelling with the first electrically conductive fluid 6.

FIGS. 4A-4B, 5A-5B, 6A-6B and 7A-7B are tables showing the diffusion potential of various versions of the combination electrode 1. Sixteen prototype combination electrodes were assembled and examined with regard to their diffusion potential, their reference resistance and their outflow. The results regarding the diffusion potential and the reference resistance are compiled in the tables of FIGS. 4A-4B, 5A-5B, and 6A-6B. The results regarding the outflow of potassium from the reference chamber 20 are compiled in the tables of FIGS. 7A-7B. Twelve of the combination electrodes (in the tables denoted with 0*b*, 0*c*, 1*a*, 1*b*, 1*c*, 3*a*, 3*b*, 3*c*, 4*a*, 4*b*, 4*c*, 5*a*) are so-called T-type combination electrodes, and four of the combination electrodes (in the tables denoted with 2*a*, 2*b*, 2*c*, 6*a*) are so-called P-type combination electrodes. In the case of the T-type combination electrodes, the reference chamber 20 has a volume of approximately 3.5 ml. In the case of the P-type combination electrodes, the reference chamber 20 has a volume of approximately 7 ml. As can be seen from the tables of FIGS. 4A-4B, 5A-5B and 6A-6B, diaphragms with a thickness of 0.35 mm, 0.7 mm (2×0.35 mm, i.e., two layers of the hydrogel were placed one on top of the other), 0.50 mm and 0.55 mm were used. Tecophilic® TG-500 and Tecophilic® TG-2000 were used as the hydrogel. For the first electrically conductive fluid 6, a mixture was used that included an aqueous KCl solution, glycerin and hydroxyethyl cellulose. The versions of combination electrode 1 analyzed in the tables all included the plug 11. All sixteen combination electrodes were easily filled with the first electrically conductive fluid 6 in a vacuum container.

The diffusion potential $U_{DIFF}$ was determined by measuring the diffusion potential of each combination electrode prototype compared to the diffusion potential of an external reference electrode. The reference resistance $R_{REF}$ was measured by determining the resistance between the reference electrode 3 and the fluid to be measured. The measurements were carried out with the fluid to be measured being a 3M KCl solution, a buffer solution with pH 4, a buffer solution with pH 7, and a buffer solution with pH 10. The diffusion potential $U_{DIFF}$ and the reference resistance $R_{REF}$ are listed in the tables on the left to designate values measured one day after rinsing and on the right to designate values measured thirty minutes after rinsing. The measurement values are listed to the left and right of the "/" character in the third to fifth columns of the tables of FIGS. 4A-4B, 5A-5B and 6A-6B. The measurements were repeated in buffer solutions that, compared to the buffer solution of FIGS. 4A-4B are diluted to a ratio of 1:10 (FIGS. 5A-5B) and to a ratio of 1:100 (FIGS. 6A-6B). The designation "und." in the tables of FIGS. 5A-5B and 6A-6B indicates that the KCl solution was not diluted.

The fourth column in the tables of FIGS. 4A-4B, 5A-5B and 6A-6B indicates the maximum voltage difference $\Delta U_{DIFF}$ of the diffusion potentials measured in the four different solutions as indicated in the corresponding third column of the tables. Effectively functioning electrodes have at most a maximum voltage difference $\Delta U_{DIFF}$ of 3 mV. The maximum voltage difference $\Delta U_{DIFF}$ of 3 mV results in a high measuring accuracy of the combination electrode. As can be seen from the tables of FIGS. 4A-4B, 5A-5B and 6A-6B, all sixteen combination electrodes meet this criterion after a measurement period of thirty minutes. In addition, the reference resistance $R_{REF}$ should not be higher than 50 kOhm for an effectively functioning electrode, which each of the various versions of combination electrode 1 analyzed in the tables fulfills. Because the reference resistance is not higher than 50 kOhm, the requirements for the testing electronics designed to measure the voltage between the working electrode and the measuring electrode are not very high. In addition, the combination electrodes have only a low diffusion potential $U_{DIFF}$ with a maximum amount of 3 mV after the measurement period of 30 minutes.

In order to determine the outflow of potassium from the reference chamber 20, each combination electrode 1 was stored in deionized water for seven days such that the diaphragm 10 was in contact with the deionized water. The amount of potassium in the deionized water was then determined using mass spectrometry. The amount of potassium determined using mass spectrometry is listed in the third column of the table of FIGS. 7A-7B. The designation "ICP-MS" in the third column stands for inductively coupled plasma-mass spectrometry. In addition, the amount of potassium in the deionized water was determined by a conductivity measurement. The amount of potassium determined using a conductivity measurement is listed in the fourth column of the table of FIGS. 7A-7B. The designation "conv. via cond." stands for converted via conductivity. The conductivity measurement was calibrated using the measurement data the third column. The potassium outflow per day is indicated in the third column and the fourth column in the table of FIGS. 7A-7B.

Figure 2:
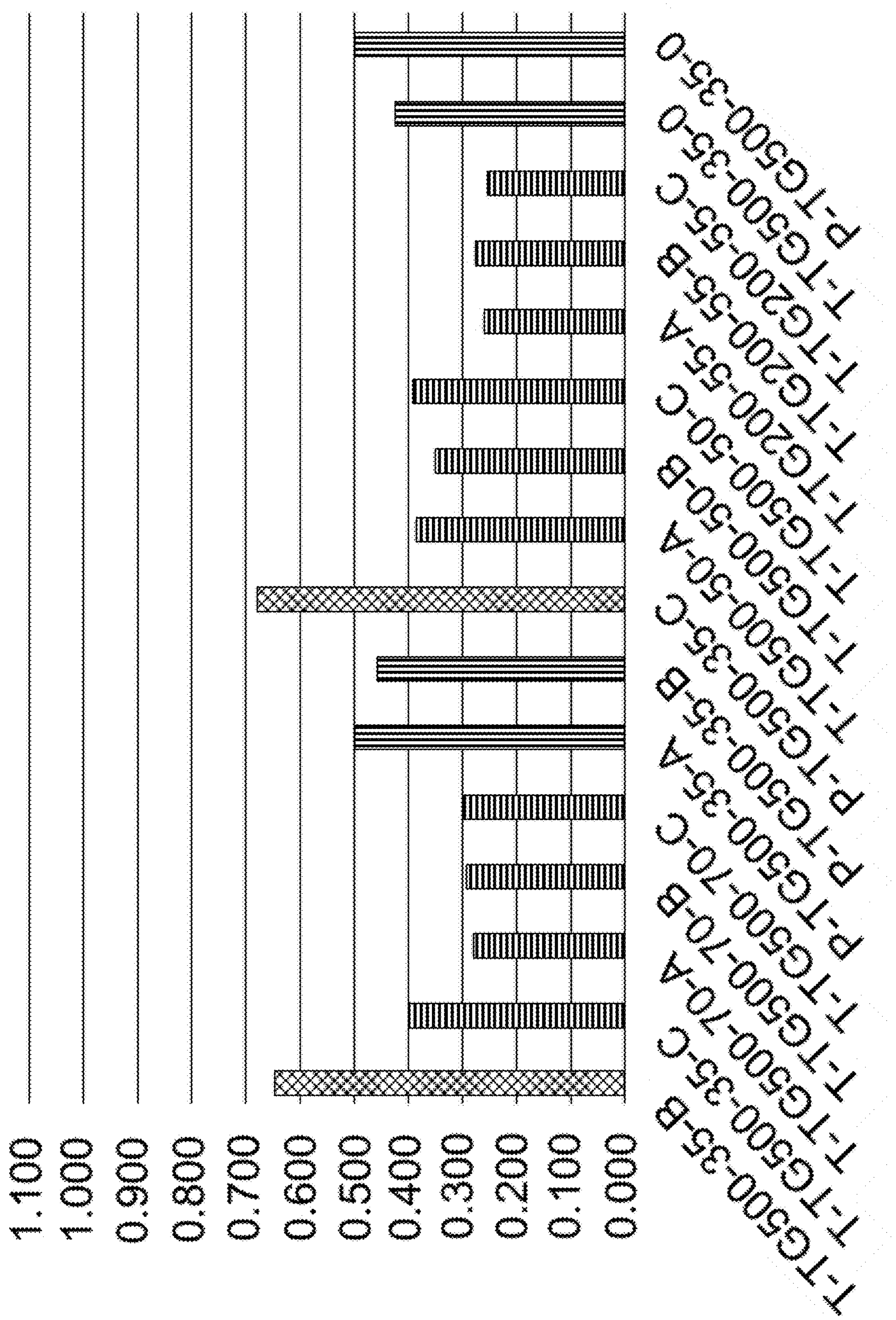
FIG. 2 is a plot in which an outflow of potassium is plotted for various versions of the combination electrode of FIG. 1.

FIG. 2 is a diagram of the potassium outflow from the reference chamber in mg per day plotted against the respective version of the combination electrode 1. In FIG. 2, T means T-type, P means P-type, TG500 means Tecophilic® TG-500, TG2000 means Tecophilic® TG-2000 and the subsequent number denotes the thickness of the diaphragm 10 in 10-2 mm. The subsequent letter denotes the structurally identical version of the combination electrode 1 and corresponds to the letter in the first column of the tables of FIGS. 4A-4B, 5A-5B, 6A-6B and 7A-7B. FIGS. 2 and 7A-7B show that only two of the versions of the combination electrode 1 (T-TG500-35-B and P-TG500-35-C) have a potassium outflow of more than 0.5 mg per day. These test results can be explained by the fact that the diaphragm 10 of these prototypes was slightly damaged accidentally when the diaphragm was introduced into the opening. The test results also show that the amount of potassium outflow decreases with increasing thickness of the diaphragm 10.

Figure 3:
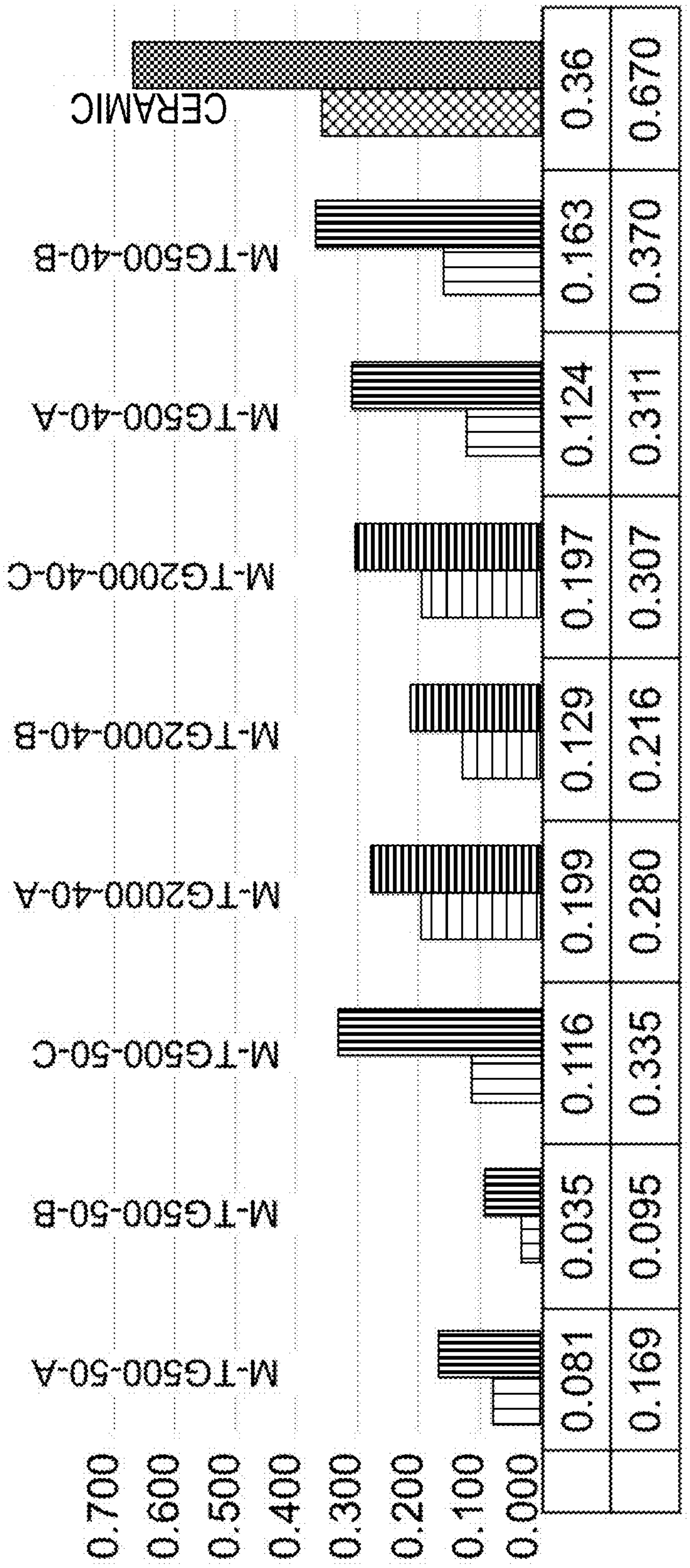
FIG. 3 is a plot in which an outflow of potassium is plotted at two different temperatures for various versions of the combination electrode of FIG. 1.

FIG. 3 is a diagram that shows the potassium outflow of additional versions of the combination electrode 1 that are M-type combination electrodes. One of the M-type combination electrodes is a conventional combination electrode that has a porous ceramic diaphragm and is labeled as "CERAMIC" in FIG. 3. The diagraph of FIG. 3 plots the potassium outflow in mg per day for each additional version of the combination electrode 1. In FIG. 3, M means M-type, TG500 means Tecophilic® TG-500, TG2000 means Tecophilic® TG-2000 and the subsequent number denotes the thickness of the diaphragm 10 in 10-2 mm. The subsequent letter denotes the structurally identical version of the combination electrode 1. The M-type combination electrode 1 differs from the T-type combination electrode 1 and the P-type combination electrode 1 in that in the M-type combination electrode 1, the outer diameter of the inner tube 5 and the inner diameter of the outer tube 4 are smaller than those of the T-type combination electrode 1 and the P-type combination electrode 1. For each version of the M-type combination electrode 1, the potassium outflow was determined at a temperature of the deionized water of 21° C. (left bar) and 37° C. (right bar). The potassium outflow at each temperature is indicated under the bars, with the top number being the potassium outflow at 21° C. and the bottom number being the potassium outflow at 37° C. For all versions, the potassium outflow is higher at the higher temperature. FIG. 3 shows that the potassium outflow with the Tecophilic® diaphragms is less than with the porous ceramic diaphragm.

The testing on the prototype combination electrodes also showed that the reference chamber 20 can be filled with a 3 M KCl solution within a vacuum container. It was also possible to show that a solid electrolyte can be introduced into the reference chamber 20 in the vacuum container. For this purpose, the reference chamber 20 is filled with a monomer mixture, which is subsequently polymerized to form the solid electrolyte. The solid electrolyte can, for example, be a polymer that is obtained by polymerizing N-acryloylaminoethoxyethanol or by copolymerizing N-acryloylaminoethoxyethanol with a hydroxyalkyl methacrylate, as described, for example, in WO 2005/073704 A1.

LIST OF REFERENCE NUMERALS

1 combination electrode
2 working electrode
3 reference electrode
4 outer tube
5 inner tube
6 first electrically conductive fluid
7 second electrically conductive fluid
8 storage vessel
9 glass membrane
10 diaphragm
11 plug
12 head part
13 potting compound
14 sealing ring
15 first outer tube longitudinal end
16 second inner tube longitudinal end
17 first inner tube longitudinal end
18 second outer tube longitudinal end
19 inner tube chamber
20 reference chamber
21 seal Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A combination electrode comprising:

a working electrode;

a reference electrode;

a diaphragm made of a hydrogel; and a first electrically conductive fluid that is in contact with the reference electrode and the diaphragm such that the diaphragm is coupled to the reference electrode in an electrically conductive manner through the first electrically conductive fluid;

an outer tube with an inner wall; and an inner tube that is disposed inside the outer tube, wherein the inner tube has an outer wall, wherein the first electrically conductive fluid is disposed between the inner tube and the outer tube, wherein an annular gap is disposed between an end of the outer tube and the outer wall of the inner tube, and wherein the diaphragm seals the annular gap by pressing against both the outer wall of the inner tube and the inner wall of the outer tube.

2. The combination electrode of claim 1, wherein the hydrogel is a thermoplastic polyurethane.

3. The combination electrode of claim 2, wherein the thermoplastic polyurethane is a block copolymer that includes a monomer A

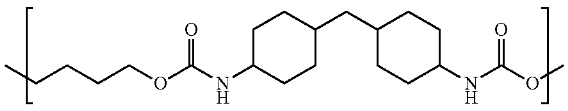

and a monomer B

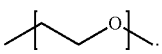
.

4. The combination electrode of claim 3, wherein the block copolymer has an average molar mass that ranges from $50*10^3$ g/mol to $180*10^3$ g/mol.

5. The combination electrode of claim 1, wherein the hydrogel is a polymer type selected from the group consisting of: hydroxyethyl methacrylate and vinyl pyrrolidone.

6. The combination electrode of claim 1, wherein the hydrogel is a thermoplastic elastomer.

7. The combination electrode of claim 1, wherein the hydrogel is selected from the group consisting of: an ionic strength-responsive smart hydrogel and a thermoresponsive smart hydrogel.

8. The combination electrode of claim 1, further comprising:

a reference chamber that contains the first electrically conductive fluid; and an opening to the reference chamber, wherein the diaphragm is disposed in the opening and seals the opening.

9. The combination electrode of claim 1, wherein the diaphragm has no pores.

10. The combination electrode of claim 1, wherein the combination electrode is a pH glass electrode.

11. A combination electrode comprising:

a working electrode;

a reference electrode;

a diaphragm made of a hydrogel; and a first electrically conductive fluid that is in contact with the reference electrode and the diaphragm such that the diaphragm is coupled to the reference electrode in an electrically conductive manner through the first electrically conductive fluid, wherein the hydrogel is a thermoplastic polyurethane, wherein the thermoplastic polyurethane is a block copolymer that includes a monomer A

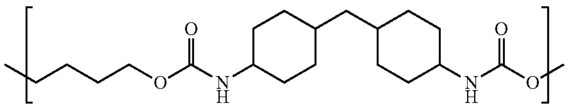

and a monomer B

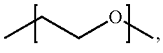
, and wherein the monomer B and the monomer A have a ratio by weight (ratio monomer B/monomer A) that ranges from 20 to 100.

12. A combination electrode comprising:

a working electrode;

a reference electrode;

a diaphragm made of a hydrogel;

a first electrically conductive fluid that is in contact with the reference electrode and the diaphragm such that the diaphragm is coupled to the reference electrode in an electrically conductive manner through the first electrically conductive fluid;

an outer tube;

an inner tube that is disposed inside the outer tube, wherein a reference chamber is formed between the inner tube and the outer tube, wherein an annular gap between an end of the outer tube and the inner tube forms an opening, and wherein the diaphragm seals the opening; and a plug that is permeable to a fluid that is to be measured by the combination electrode, wherein the plug is disposed in the opening, and wherein the plug supports the diaphragm.

13. A combination electrode comprising:

a working electrode;

a reference electrode;

a diaphragm made of a hydrogel;

a first electrically conductive fluid that is in contact with the reference electrode and the diaphragm such that the diaphragm is coupled to the reference electrode in an electrically conductive manner through the first electrically conductive fluid;

an outer tube; and an inner tube that is disposed inside the outer tube, wherein a reference chamber is formed between the inner tube and the outer tube, wherein an annular gap between an end of the outer tube and the inner tube forms an opening, wherein the diaphragm seals the opening, and wherein the working electrode is disposed in the inner tube, wherein the inner tube has a first inner tube longitudinal end that is closed by a glass membrane, wherein a second electrically conductive fluid contacts the glass membrane and the working electrode, and wherein the glass membrane is coupled to the working electrode in an electrically conductive manner through the second electrically conductive fluid.

14. A method of producing a combination electrode, comprising:

arranging an inner tube inside an outer tube, wherein the inner tube has an outer wall, and the outer tube has an inner wall, wherein a reference chamber is formed between the inner tube and the outer tube, and wherein an annular gap is disposed between a first outer tube longitudinal end of the outer tube and the outer wall of the inner tube;

inserting a working electrode into the inner tube;

inserting a reference electrode into the reference chamber;

introducing a hydrogel diaphragm in its dry state into the annular gap so as to form an end of the reference chamber; and introducing a first electrically conductive fluid into the reference chamber, wherein the hydrogel diaphragm swells upon contacting the first electrically conductive fluid and thereby seals the annular gap by pressing against both the outer wall of the inner tube and the inner wall of the outer tube, wherein the hydrogel diaphragm is coupled to the reference electrode in an electrically conductive manner through the first electrically conductive fluid when the reference electrode is in contact with the first electrically conductive fluid.

15. The method of claim 14, wherein the hydrogel diaphragm is disposed adjacent to the first outer tube longitudinal end, and wherein a second outer tube longitudinal end is disposed opposite the first outer tube longitudinal end, further comprising:

introducing the first electrically conductive fluid into the reference chamber through the second outer tube longitudinal end.

16. The method of claim 15, wherein the reference electrode is inserted into the reference chamber before the first electrically conductive fluid is introduced into the reference chamber.

17. The method of claim 14, wherein the hydrogel diaphragm in its dry state has an outer diameter that is smaller than an inner diameter of the inner wall of the outer tube, and wherein the hydrogel diaphragm is under compressive stress in the annular gap after the hydrogel diaphragm comes in contact with the first electrically conductive fluid.

18. The method of claim 14, wherein the hydrogel diaphragm is made from a thermoplastic polyurethane.

19. A method of producing a combination electrode, comprising:

arranging an inner tube inside an outer tube, wherein a reference chamber is formed between the inner tube and the outer tube, and wherein an opening between the inner tube and the outer tube is formed at a first outer tube longitudinal end of the outer tube;

inserting a working electrode into the inner tube;

inserting a reference electrode into the reference chamber;

introducing a hydrogel diaphragm in its dry state into the opening so as to form an end of the reference chamber;

introducing a first electrically conductive fluid into the reference chamber, wherein the hydrogel diaphragm swells upon contacting the first electrically conductive fluid and thereby seals the opening, wherein the hydrogel diaphragm is coupled to the reference electrode in an electrically conductive manner through the first electrically conductive fluid when the reference electrode is in contact with the first electrically conductive fluid, wherein the hydrogel diaphragm is disposed adjacent to the first outer tube longitudinal end, and wherein a second outer tube longitudinal end is disposed opposite the first outer tube longitudinal end;

sealing the second outer tube longitudinal end before introducing the first electrically conductive fluid into the reference chamber;

immersing the first outer tube longitudinal end of the outer tube into the first electrically conductive fluid so as to enable the first electrically conductive fluid to enter the reference chamber;

placing the combination electrode with the first electrically conductive fluid into a vacuum container; and evacuating and then ventilating the vacuum container so that the first electrically conductive fluid enters the reference chamber through the opening.

20. A method of producing a combination electrode, comprising:

arranging an inner tube inside an outer tube, wherein a reference chamber is formed between the inner tube and the outer tube, and wherein an opening between the inner tube and the outer tube is formed at a first outer tube longitudinal end of the outer tube;

inserting a working electrode into the inner tube;

inserting a reference electrode into the reference chamber;

introducing a hydrogel diaphragm in its dry state into the opening so as to form an end of the reference chamber; and introducing a first electrically conductive fluid into the reference chamber, wherein the hydrogel diaphragm swells upon contacting the first electrically conductive fluid and thereby seals the opening, wherein the hydrogel diaphragm is coupled to the reference electrode in an electrically conductive manner through the first electrically conductive fluid when the reference electrode is in contact with the first electrically conductive fluid, wherein the inner tube has a first inner tube longitudinal end that is closed with a glass membrane, wherein a second electrically conductive fluid contacts the working electrode and the glass membrane, and wherein the working electrode is arranged in the inner tube such that the glass membrane is coupled to the working electrode in an electrically conductive manner through the second electrically conductive fluid.

* * * * *